(12) United States Patent
Wang

(10) Patent No.: US 11,966,455 B2
(45) Date of Patent: Apr. 23, 2024

(54) TEXT PARTITIONING METHOD, TEXT CLASSIFYING METHOD, APPARATUS, DEVICE AND STORAGE MEDIUM

(71) Applicant: BOE Technology Group Co., Ltd., Beijing (CN)

(72) Inventor: Bingqian Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 275 days.

(21) Appl. No.: 17/332,478

(22) Filed: May 27, 2021

(65) Prior Publication Data

US 2022/0101060 A1 Mar. 31, 2022

(30) Foreign Application Priority Data

Sep. 29, 2020 (CN) .......................... 202011053820.9

(51) Int. Cl.
| | | |
|---|---|---|
| *G06F 18/21* | (2023.01) | |
| *G06F 18/214* | (2023.01) | |
| *G06F 18/24* | (2023.01) | |
| *G06F 18/25* | (2023.01) | |
| *G06N 3/04* | (2023.01) | |
| *G06N 3/08* | (2023.01) | |
| *G06V 10/44* | (2022.01) | |
| *G06V 30/148* | (2022.01) | |
| *G06V 30/262* | (2022.01) | |

(52) U.S. Cl.
CPC ........ *G06F 18/2163* (2023.01); *G06F 18/214* (2023.01); *G06F 18/217* (2023.01); *G06F 18/24* (2023.01); *G06F 18/254* (2023.01); *G06N 3/04* (2013.01); *G06N 3/08* (2013.01); *G06V 10/44* (2022.01); *G06V 30/158* (2022.01); *G06V 30/274* (2022.01)

(58) Field of Classification Search
CPC .. G06F 18/2163; G06F 18/214; G06F 18/217; G06F 18/24; G06F 18/254; G06F 40/30; G06F 16/353; G06N 3/04; G06N 3/08; G06N 3/045; G06V 10/44; G06V 30/158; G06V 30/274; G06V 30/19147; G06V 30/1916; G06V 30/41
See application file for complete search history.

(56) References Cited

FOREIGN PATENT DOCUMENTS

CN 110046355 A * 7/2019

OTHER PUBLICATIONS

"Williams S. Lovegrove et al., Document Analysis of PDF Files: Methods, Results and Implications, Sep. 1995, Electronic Publishing, vol. 8[2 &3] 207-220" (Year: 1995).*

(Continued)

*Primary Examiner* — Andrae S Allison
*Assistant Examiner* — Phuong Hau Cai
(74) *Attorney, Agent, or Firm* — WHDA, LLP

(57) ABSTRACT

A text partitioning method, a text classifying method, an apparatus, a device and a storage medium, wherein the method includes: parsing a content image, to obtain a target text in a text format; according to a line break in the target text, partitioning the target text into a plurality of text sections; and according to a first data-volume threshold, partitioning sequentially the plurality of text sections into a plurality of text-to-be-predicted sets, wherein a data volume of a last one text section in each of the text-to-be-predicted sets is greater than a second data-volume threshold.

16 Claims, 13 Drawing Sheets

(56) References Cited

OTHER PUBLICATIONS

"H. P. Edmundson et al., New Methods in Automatic Extracting, Apr. 1969, Journal of ACM, vol. 16, Issue 2, pp. 264-285" (Year: 1969).*

"Bharath Dandala et al., IBM Research System at MADE 2018: Detecting Adverse Drug Events from Electronic Health Records, 2018, Proceedings of Machine Learning Research 90: 39-47, 2018 Medication and Adverse Drug Event Detection Workshop" (Year: 2018).*

"Aishwarya Jadhav et al., Extractive Summarization with SWAP-NET: Sentences and Words from Alternating Pointer Networks, Jul. 2018, 56th Annual Meeting of the Association for Computational Linguistics, ACL 2018, Melbourne, pp. 142-151" (Year: 2018).*

* cited by examiner

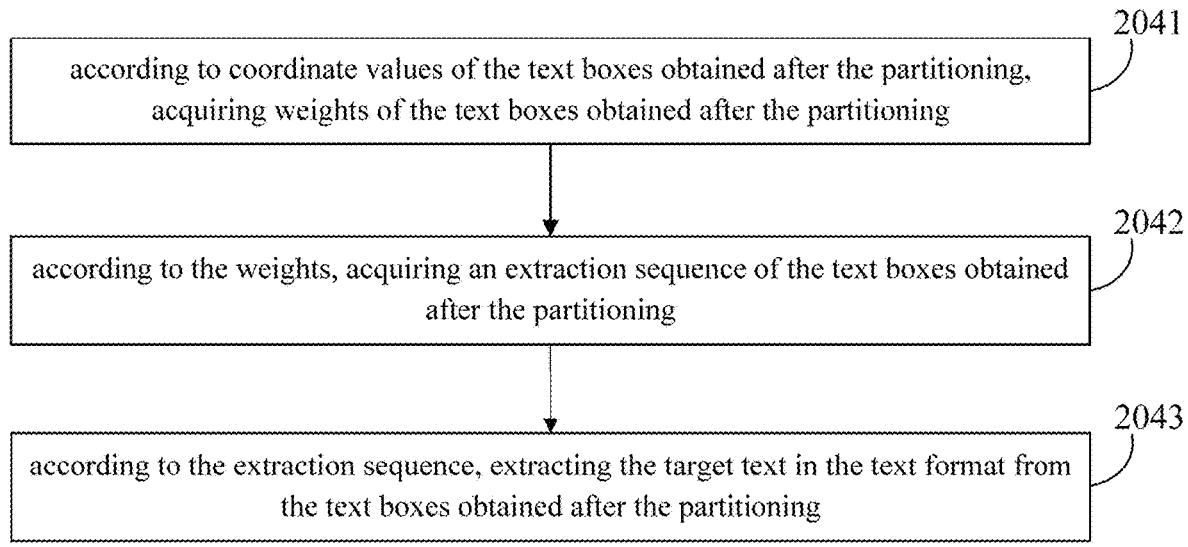
Fig. 6
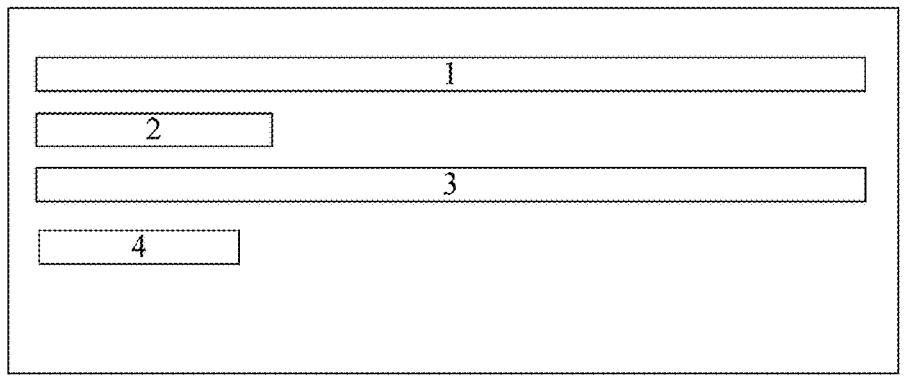
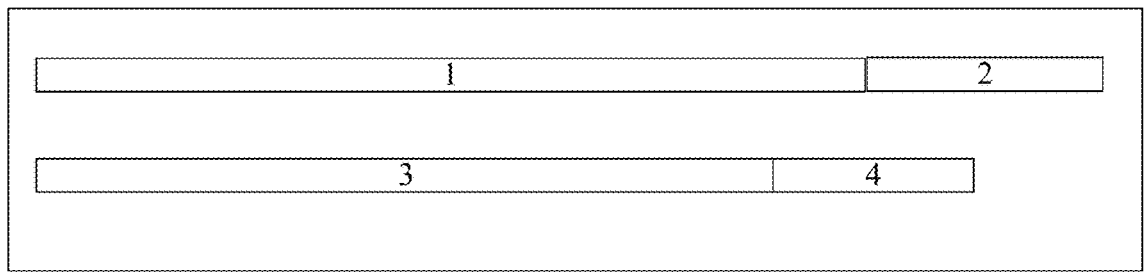
Fig. 7

| by using the multilayer label pointer network, acquiring the semantic vectors of the sample text sets, and a starting-position probability value and an ending-position probability value that are related to each of the classification labels, as the third classification result | 4031 |

| by using the multi-label classifying network, acquiring the semantic vectors of the sample text sets, and a classification probability value that is related to each of the classification labels, as the fourth classification result | 4032 |

Fig. 12

| combining individually the starting-position probability value and the ending-position probability value with the classification probability value, to obtain a target starting-position probability value and a target ending-position probability value of the semantic vectors that are related to each of the classification labels | 4041 |

| according to the semantic vectors of the sample text sets, and the target starting-position probability value, a standard starting-position probability value, the target ending-position probability value and a standard ending-position probability value that are related to each of the classification labels, acquiring the loss value of the original-text classifying model obtained after the training | 4042 |

Fig. 13

TEXT PARTITIONING METHOD, TEXT CLASSIFYING METHOD, APPARATUS, DEVICE AND STORAGE MEDIUM

CROSS REFERENCE TO RELEVANT APPLICATIONS

The present disclosure claims the priority of the Chinese patent application filed on Sep. 29, 2020 Before the Chinese Patent Office with the application number of 202011053820.9 and the title of "TEXT PARTITIONING METHOD, TEXT CLASSIFYING METHOD, APPARATUS, DEVICE AND STORAGE MEDIUM", which is incorporated herein in its entirety by reference.

TECHNICAL FIELD

The present disclosure relates to the technical field of computers, and particularly relates to a text partitioning method, a text classifying method, an apparatus, a device and a storage medium.

BACKGROUND

With the development of the electronic information technology, traditional paper texts cannot satisfy the demands of people on information gathering and storage. However, information texts such as resumes, certificates and identification cards are still extensively used by people in the paper form. Therefore, how to extract and classify valuable text information from the paper texts has become one of the key issues in information searching and storage.

In the related art, usually the text information extracted from paper texts are classified by using means such as a rule template and a key-word dictionary, to satisfy the structured storage of the text information. Subsequently, gradually emerge network models such as a semantic identification model that can identify the semantics of text information. However, in the identification of text information by using the semantic identification model, it is required to cut the text information according to the data volume, and then input into the semantic identification model for the identification.

SUMMARY

The present disclosure provides a text partitioning method, a text classifying method, an apparatus, a device and a storage medium.

In a first aspect, the present disclosure provides a text partitioning method, wherein the method comprises:
  parsing a content image, to obtain a target text in a text format;
  according to a line break in the target text, partitioning the target text into a plurality of text sections; and
  according to a first data-volume threshold, partitioning sequentially the plurality of text sections into a plurality of text-to-be-predicted sets, wherein a data volume of a last one text section in each of the text-to-be-predicted sets is greater than a second data-volume threshold.

In a second aspect, the present disclosure provides a text classifying method, wherein the method comprises:
  by using the text partitioning method, acquiring the text-to-be-predicted sets;
  inputting the text-to-be-predicted sets into a target-text classifying model that has been pre-trained, wherein the target-text classifying model comprises at least: a multilayer label pointer network and a multi-label classifying network;
  by using the multilayer label pointer network, acquiring a first classification result of the text-to-be-predicted sets, and by using the multi-label classifying network, acquiring a second classification result of the text-to-be-predicted sets; and
  according to the first classification result and the second classification result, acquiring a target classification result of the text-to-be-predicted sets.

In a third aspect, the present disclosure provides an electronic device, wherein the electronic device comprises a memory, a processor and a computer program that is stored in the memory and is executable on the processor, and the processor, when executing the computer program, performs the following operations:
  parsing a content image, to obtain a target text in a text format;
  according to a line break in the target text, partitioning the target text into a plurality of text sections; and
  according to a first data-volume threshold, partitioning sequentially the plurality of text sections into a plurality of text-to-be-predicted sets, wherein a data volume of a last one text section in each of the text-to-be-predicted sets is greater than a second data-volume threshold.

In a fourth aspect, the present disclosure provides a computer-readable storage medium, wherein the computer-readable storage medium stores a computer program, and the computer program, when executed by the processor, performs the following operations:
  parsing a content image, to obtain a target text in a text format;
  according to a line break in the target text, partitioning the target text into a plurality of text sections; and
  according to a first data-volume threshold, partitioning sequentially the plurality of text sections into a plurality of text-to-be-predicted sets, wherein a data volume of a last one text section in each of the text-to-be-predicted sets is greater than a second data-volume threshold.

In a fifth aspect, the present disclosure provides a computer program, wherein the computer program comprises a computer-readable code, and when the computer-readable code is executed on a calculating and processing device, the computer-readable code causes the calculating and processing device to implement the text partitioning method stated above.

In a sixth aspect, the present disclosure provides a computer program, wherein the computer program comprises a computer-readable code, and when the computer-readable code is executed on a calculating and processing device, the computer-readable code causes the calculating and processing device to implement the text classifying method stated above.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

By reading the following detailed description of the preferable embodiments, various other advantages and benefits will become clear to a person skilled in the art. The drawings are merely intended to show the preferable embodiments, and are not to be considered as limiting the present disclosure. Furthermore, throughout the drawings, the same reference signs denote the same elements. In the drawings:

FIG. 6 is a flow chart of the steps of the method for sorting text boxes according to an embodiment of the present disclosure;

FIG. 7 is a flow chart of the steps of the method for partitioning text lines according to an embodiment of the present disclosure;

FIG. 12 is a flow chart of the steps of the model outputting method according to an embodiment of the present disclosure;

FIG. 13 is a flow chart of the steps of the model verifying method according to an embodiment of the present disclosure;

DETAILED DESCRIPTION

The exemplary embodiments of the present disclosure will be described in further detail below with reference to the drawings. Although the drawings illustrate the exemplary embodiments of the present disclosure, it should be understood that the present disclosure may be implemented in various forms, which should not be limited by the embodiments illustrated herein. In contrast, the purpose of providing those embodiments is to more clearly understand the present disclosure, and to completely convey the scope of the present disclosure to a person skilled in the art.

Figure 1:
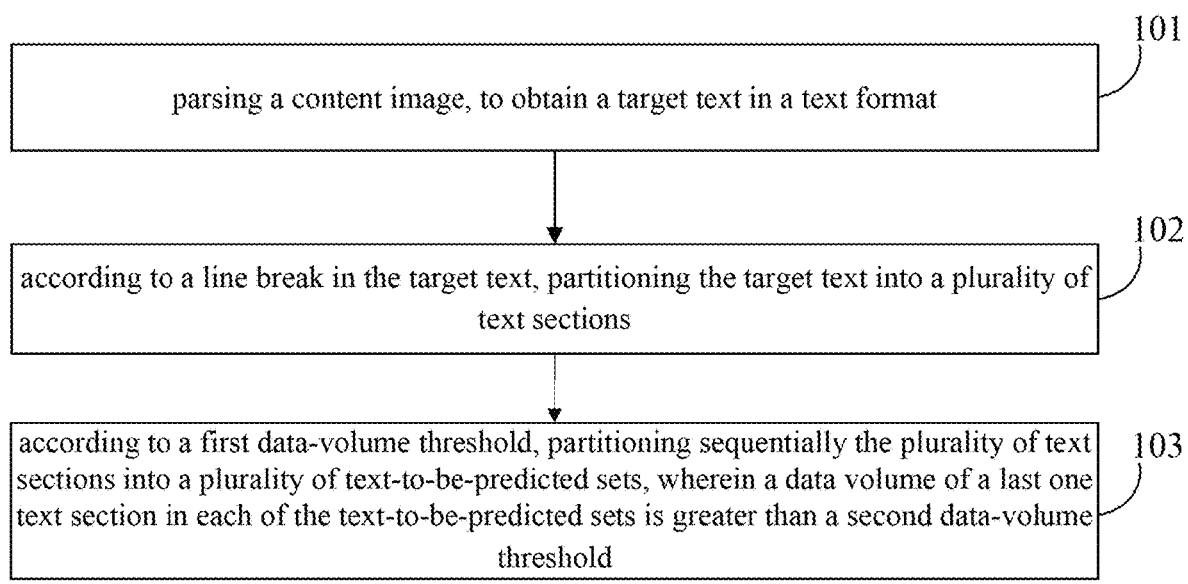
FIG. 1 is a flow chart of the steps of the text partitioning method according to an embodiment of the present disclosure.

FIG. 1 is a flow chart of the steps of the text partitioning method according to an embodiment of the present disclosure. The method comprises:

Step 101: parsing a content image, to obtain a target text in a text format.

In an embodiment of the present disclosure, the content image refers to image data containing text contents, for example, an image obtained by photographing or scanning a paper file containing text contents, or a video image frame extracted from a video and containing text contents, which may be particularly determined according to practical demands, as long as the content image contains extractable text contents, and is not limited herein.

Optionally, the position where the text is located in the content image is identified by using a text identifying model, and subsequently the target text is extracted by using a text extracting model from the position where the identified text is located.

Step 102: according to a line break in the target text, partitioning the target text into a plurality of text sections.

In an embodiment of the present disclosure, usually, if the text extracting model, in the process of the text extraction from the image, finds that the target text wraps the line when one line is not full, the text extracting model adds a line break to the extracted target text, and, therefore, can partition the text contents into a plurality of text sections according to the line break.

Step 103: according to a first data-volume threshold, partitioning sequentially the plurality of text sections into a plurality of text-to-be-predicted sets, wherein a data volume of a last one text section in each of the text-to-be-predicted sets is greater than a second data-volume threshold.

In an embodiment of the present disclosure, the first data-volume threshold is a data-volume threshold used for restricting the quantity of the text-to-be-predicted sets, and the second data-volume threshold is a data-volume threshold that the data volume of the last one text section in each of the text-to-be-predicted sets is required to be greater than.

In practical applications, the data volume of each of the text-to-be-predicted sets is not required to be less than or equal to the first data-volume threshold, but may be slightly greater than the first data-volume threshold. That is because that the data volume of each of the text sections is uncertain, and, therefore, it is possible that the data volume of a certain text-to-be-predicted set is less than the first data-volume threshold before a certain text section is added, but, after the addition, it exceeds the first data-volume threshold. In this case, the text-to-be-predicted set is allowed to keep the text section, in order to, by using the first data-volume threshold, ensure that the data volume of the obtained text-to-be-predicted set is not too large, and also ensure that the data volume of the obtained text-to-be-predicted set is not too small.

Figure 2:
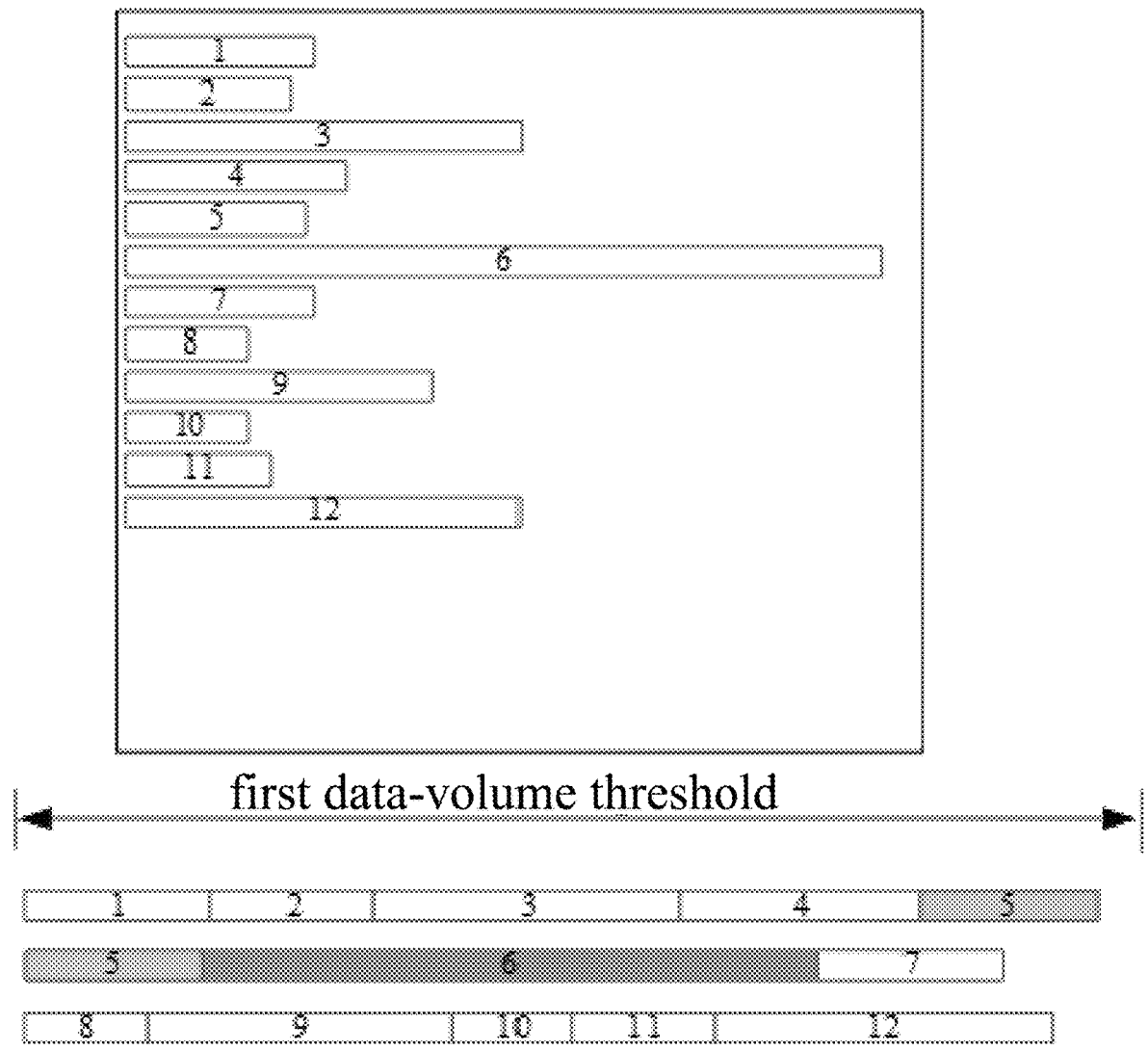
FIG. 2 is a schematic diagram of the effect of the text partitioning method according to an embodiment of the present disclosure.

As an example, referring to FIG. 2, FIG. 2 shows a schematic diagram of the effect of the text partitioning method according to an embodiment of the present disclosure. It contains 1-12 text sections, and, by grouping the text sections 1-5, the text sections 6-7 and the text sections 8-12 together, four text-to-be-predicted sets that are less than or equal to the first data-volume threshold are obtained. It should be noted that the first data-volume threshold is exhibited here in the figure in the form of a string length.

The second data-volume threshold refers to the data-volume threshold that the last one text section in each of the text-to-be-predicted sets is required to be greater than. It can be understood that the title may also serve as one text section, as a summary and explanation of the text sections therebelow, and is an associated content of the following text sections. Such a short text content facilitates the effect of the semantic identification on the text sections by the model, and, if such a short text section is, in the process of the set partition, separated from the text sections therebelow with an associated content, the subsequent effect of prediction of the text classifying model will be affected. Therefore, by ensuring that the data volume of the last one text section in each of the text-to-be-predicted sets is greater than the second data-volume threshold, it can be prevented that the title and the text sections with a content associated therewith are partitioned into different text-to-be-predicted sets, which can effectively improve the reasonableness of the partitioning of the text-to-be-predicted sets. As an example, as shown in FIG. 2, because the data volume of the text section 5 is less than the second data-volume threshold, the text section 5 might be a title associated with the contents of the text sections 6 and 7, and, therefore, it is required to group the text section 5 and the text sections 6 and 7 together, to improve the reasonableness of the partitioning of the text-to-be-predicted sets.

The text partitioning method according to the present disclosure, by, after the extracted text has been partitioned into the text sections according to the line break, partitioning the text with the text sections as the units by using the first data-volume threshold as the restriction to obtain the text-to-be-predicted sets, prevents the problem in the related art of the data losing caused by the partitioning simply based on the data volume, and, by ensuring that the data volume of the last one text section in each of the text-to-be-predicted sets is greater than the second data-volume threshold, ensures that the title information having a small data volume can be partitioned with the following texts associated therewith into the same one text-to-be-predicted set, which improves the reasonableness of the text partitioning, and in turn increases the accuracy of the prediction of the text classifying model.

Figure 3:
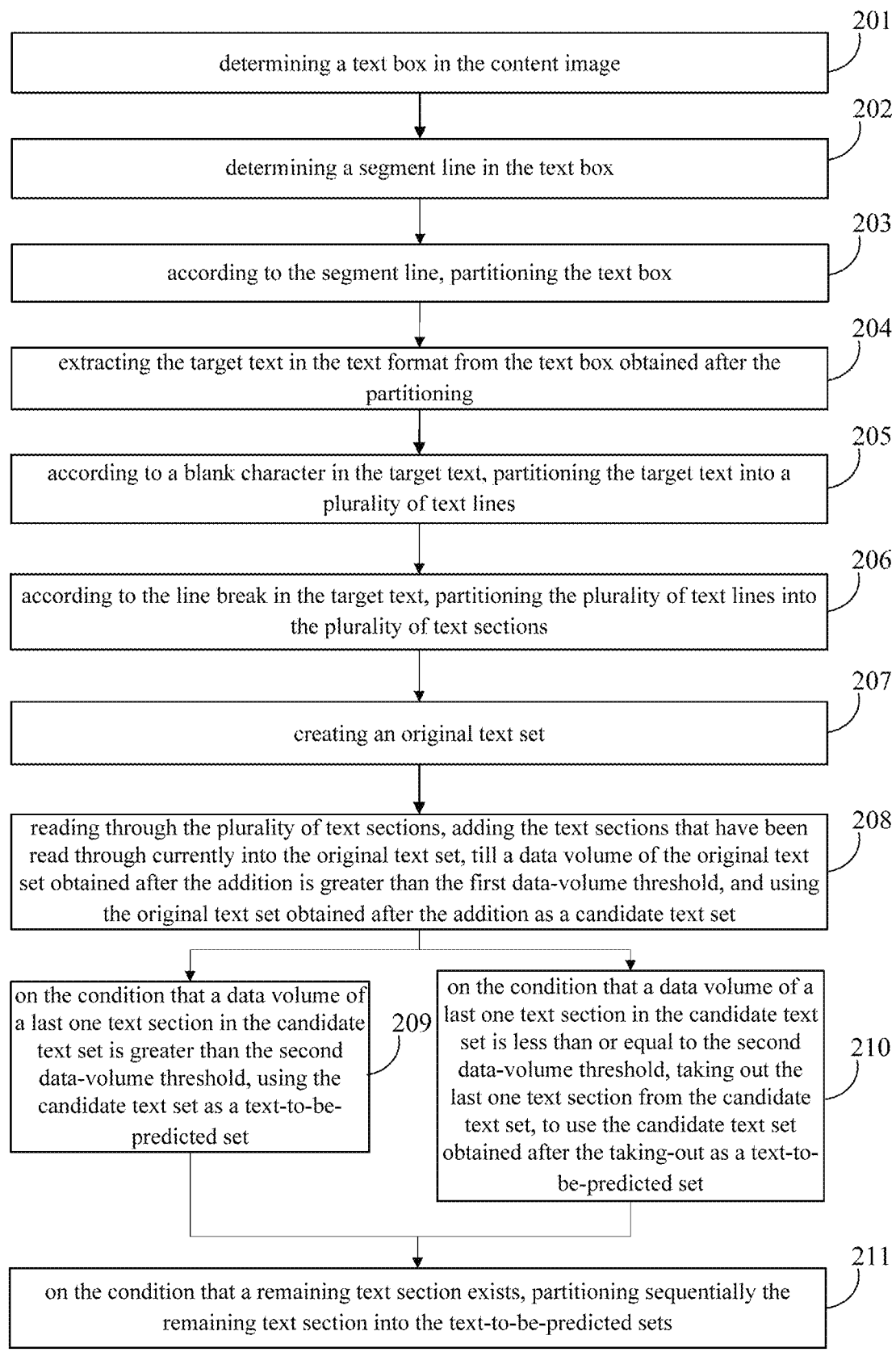
FIG. 3 is a flow chart of the steps of another text partitioning method according to an embodiment of the present disclosure.

FIG. 3 is a flow chart of the steps of another text partitioning method according to an embodiment of the present disclosure. The method comprises:

Step 201: determining a text box in the content image.

In an embodiment of the present disclosure, the text box refers to a box-shaped region where a text content is located in the content image.

In practical applications, the text box in the content image may be determined by parsing the content image by using an image parser such as pdfminer (a parser for images in the pdf format provided by the python language) and pdfbox (a parser for images in the pdf format provided by the java language). Therefore, it is required to ensure in advance that the content image is in the Portable Document Format (pdf). However, if the parser can support another image format, the content image may also be converted into the another suitable image format, as long as the text box where the text is located can be determined from the content image, which is not limited herein.

Step 202: determining a segment line in the text box.

In an embodiment of the present disclosure, the segment line refers to the boundary line for boundary delimitation between the transverse text contents in the text image. It can be understood that content images such as a resume and a product description commonly have the content layout in the style of a transverse layout, which results in that the content image does not only have text boxes distributed longitudinally, but also have text boxes distributed transversely. However, conventional image parsers are developed mainly based on the longitudinally distributed text boxes, and therefore have a poor capacity of identifying transversely distributed text boxes, which results in that a plurality of text boxes that are distributed transversely might be partitioned into the same one text box, which results in that, after the different contents are partitioned into the same one text box, the extracted text contents have data-line confusion, which means that the different contents interpenetrate each other.

However, if a plurality of text boxes are partitioned into the same one text box, then the text box formed by the plurality of text boxes will have a segment line used by the user for distinguishing the plurality of text boxes, and such a segment line is provided by the maker of the content image in order to enable the different sections in the content image to be effectively distinguished. In practical applications, the position of the segment line may be pre-set according to the different sections, and the position of the segment line may also be determined based on the difference between the background colors or the textures of the different sections. The particular method for determining the segment line may be determined according to practical demands, and is not limited herein.

Figure 4:
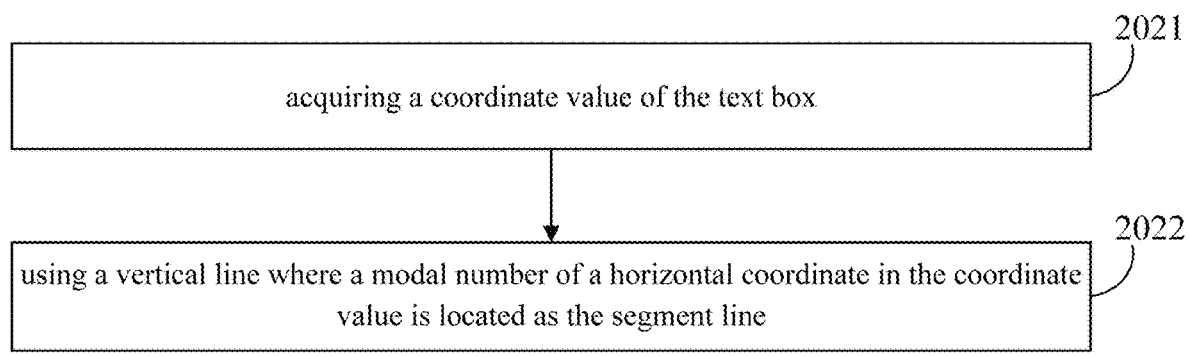
FIG. 4 is a flow chart of the steps of the method for determining a segment line according to an embodiment of the present disclosure.

Optionally, referring to FIG. 4, the step 202 comprises:

Sub-step 2021: acquiring a coordinate value of the text box.

In an embodiment of the present disclosure, the coordinate value of the text box may be the coordinate value of the text box in the coordinate system that is obtained by quantization of the overall size of the content image, and may also be the coordinate value of the text box in the coordinate system that is obtained by quantization of the size of the text box, which may be particularly determined according to practical demands, and is not limited herein.

Sub-step 2022: using a vertical line where a modal number of a horizontal coordinate in the coordinate value is located as the segment line.

In an embodiment of the present disclosure, the modal number of the coordinate value of the transverse boundary line of the text box is obtained, and subsequently the vertical line where the modal number is located in the coordinate system is used as the segment line.

Figure 5:
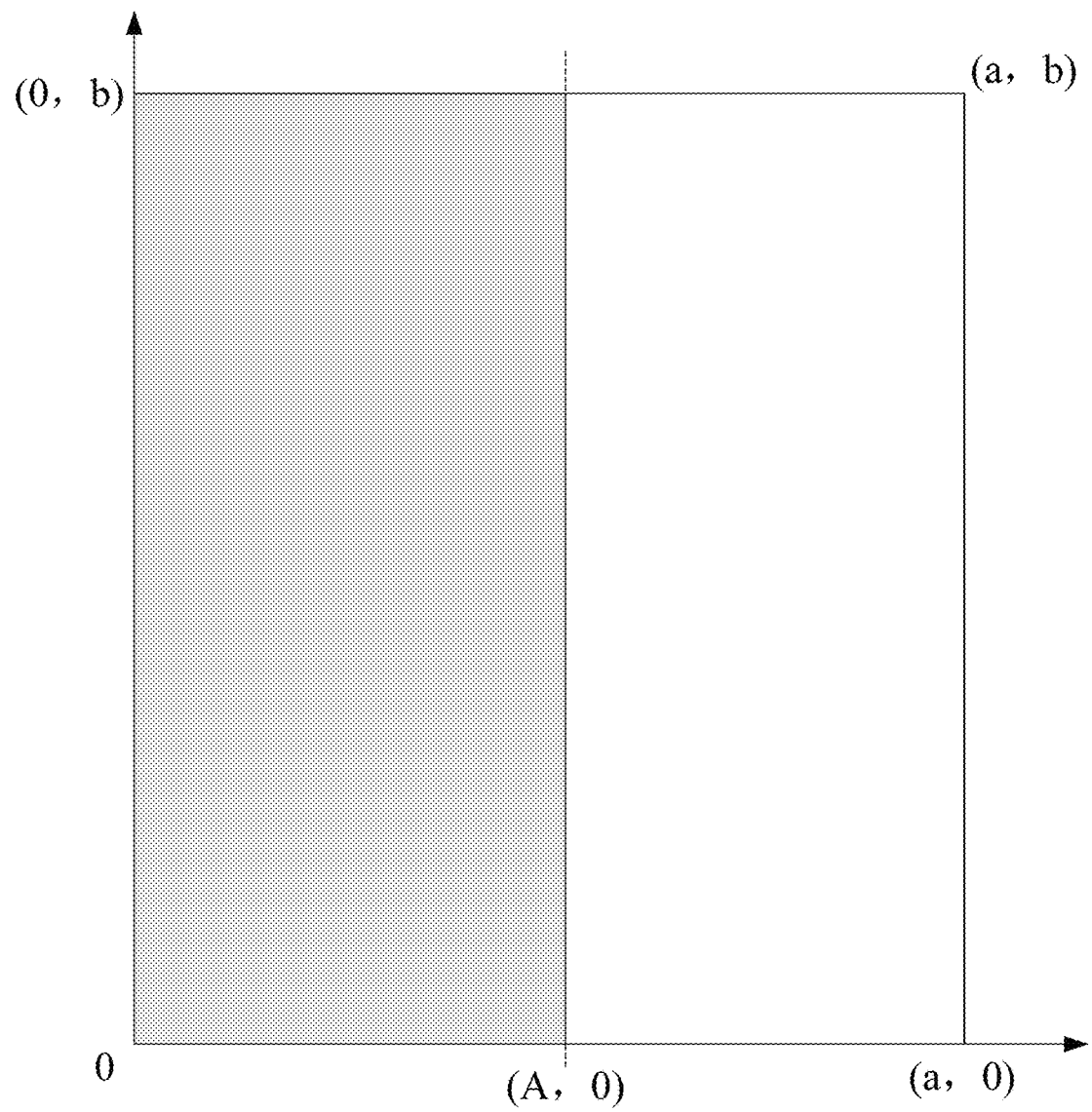
FIG. 5 is a schematic diagram of the effect of the method for determining a segment line according to an embodiment of the present disclosure.

As an example, referring to FIG. 5, FIG. 5 shows a schematic diagram of the effect of a method for determining the segment line. In it, the value range of the horizontal coordinate of the text box is 0 to a, and the value range of the vertical coordinate is 0 to b. Accordingly, the modal number A of the 0 to a is obtained, and, by using the vertical line, with the A as the horizontal coordinate, of the coordinate system as the segment line, the text box can be partitioned into two left and right text boxes.

Step 203: according to the segment line, partitioning the text box.

In an embodiment of the present disclosure, according to the obtained segment line, the original text box may be partitioned, to obtain a plurality of new text boxes, and, as compared with the original text boxes, the newly obtained text boxes are partitioned more accurately. Certainly, if no segment line exists in the text box, the text box is not required to be partitioned.

The embodiment of the present disclosure, by partitioning the text box according to the segment line in the text box, enables the obtained text boxes to be partitioned more accurately, which prevents the data-line confusion caused by erroneous identification by the parser.

Step 204: extracting the target text in the text format from the text box obtained after the partitioning.

In an embodiment of the present disclosure, the target text may be extracted from the text box obtained after the partitioning by using text extracting techniques such as the Optical Character Recognition (OCR) technique.

The embodiment of the present disclosure, by directly using the modal number of the coordinate value of the text box as the segment line, increases the efficiency of the acquirement of the segment line.

Optionally, referring to FIG. 6, the step 204 comprises:

Sub-step 2041: according to coordinate values of the text boxes obtained after the partitioning, acquiring weights of the text boxes obtained after the partitioning.

In an embodiment of the present disclosure, because the sequence between the text boxes obtained after the partitioning directly influences the effect of the subsequent text identification, it is required to reasonably sort the text boxes obtained from the partitioning, to ensure that the texts extracted subsequently can maintain the sequence of the contents in the text image.

The weights of the text boxes obtained after the partitioning may be determined according to the coordinate values of the text boxes in the content image. Particularly, the weights of the text boxes may be acquired by using the following formula (1):

$$xy = y_1 + 1/(x_1 + \Delta x) \quad (1)$$

wherein xy is the weights of the text boxes, $y_1$ is the maximum value of the vertical coordinates of the text boxes, $x_1$ is the maximum value of the horizontal coordinates of the text boxes, and $\Delta x$ is the margin, wherein the margin is used for preventing that, when $x_1$ is 0, the weight cannot be calculated.

Sub-step 2042: according to the weights, acquiring an extraction sequence of the text boxes obtained after the partitioning.

In an embodiment of the present disclosure, according to the weights of the text boxes obtained after the partitioning, they are sorted from larger to smaller, and then the extraction sequence of the text boxes obtained after the partitioning can be obtained, wherein the extraction sequence refers to the sequence of the extraction of the texts in the text boxes obtained after the partitioning.

Sub-step 2043: according to the extraction sequence, extracting the target text in the text format from the text boxes obtained after the partitioning.

In an embodiment of the present disclosure, according to the obtained extraction sequence, the target text in the text format can be extracted sequentially from the text boxes obtained after the partitioning. Because the extraction sequence is determined according to the weights of the text boxes obtained after the partitioning, the target texts that are extracted according to the extraction sequence have the same sequence as that of the text contents in the content image.

The embodiment of the present disclosure, by determining the weights of the text boxes according to the coordinate values of the text boxes, and then performing text extraction sequentially to the text boxes according to the weights, ensures that the sequence of the extracted target texts can be the same as that of the arrangement of the text contents in the content image, and prevents the problem of disorder in the text extraction.

Step 205: according to a blank character in the target text, partitioning the target text into a plurality of text lines.

In an embodiment of the present disclosure, usually, the text extracting technique, in the process of the text extraction to the image, adds a blank character subsequent to each of the extracted lines of text. Therefore, the target text may be partitioned into a plurality of text lines according to the blank character.

As an example, referring to FIG. 7, FIG. 7 shows a schematic diagram of the effect of the method for partitioning text lines according to an embodiment of the present disclosure. It contains four text lines 1, 2, 3 and 4, wherein the text lines 2 and 4 are not full as one line. Therefore, the text lines 1 and 2 are combined as one text section, and the text lines 3 and 4 are combined as one text section.

Step 206: according to the line break in the target text, partitioning the plurality of text lines into the plurality of text sections.

The embodiment of the present disclosure, by reasonably partitioning the target text into a plurality of text sections according to the blank character and the line break in the target text, ensures the accuracy of the text-section extraction, and prevents the problem of data losing caused by text-section partitioning directly according to the data volume.

Step 207: creating an original text set.

In an embodiment of the present disclosure, the original text set is used for obtaining the text-to-be-predicted set by adding a text section. Particularly, the original text set may be added by creating a content window.

Step 208: reading through the plurality of text sections, adding the text sections that have been read through currently into the original text set, till a data volume of the original text set obtained after the addition is greater than the first data-volume threshold, and using the original text set obtained after the addition as a candidate text set.

In an embodiment of the present disclosure, according to the sequence of the text sections, the text sections are sequentially read through, and in each time, the text section that is read through currently is added into the original text set. Furthermore, after each time of the addition, it is determined whether the data volume of the original text set obtained after the addition is greater than the first data-volume threshold. If it is less than or equal to the first data-volume threshold, then the remaining text sections are continued to be read through. If it is greater than the first data-volume threshold, the process of reading through the text sections is stopped to be executed, and, by using the current original text set obtained after the addition as the candidate text set, the following step 209 is entered.

Step 209: on the condition that a data volume of a last one text section in the candidate text set is greater than the second data-volume threshold, using the candidate text set as a text-to-be-predicted set.

In an embodiment of the present disclosure, if the data volume of the last one text section in a candidate text set is greater than the second data-volume threshold, that indicates that the last one text section is not a content associated with the next one text section, and the candidate text set can be directly used as a text-to-be-predicted set.

Step 210: on the condition that a data volume of a last one text section in the candidate text set is less than or equal to the second data-volume threshold, taking out the last one text section from the candidate text set, to use the candidate text set obtained after the taking-out as a text-to-be-predicted set.

In an embodiment of the present disclosure, before the candidate text set is used as the text-to-be-predicted set, if the data volume of the last one text section in the candidate text set is less than or equal to the second data-volume threshold, it is determined that the text section is a content associated with the next one text section, the last one text section is taken out from the candidate text set, and subsequently the candidate text set obtained after the taking-out is used as a text-to-be-predicted set.

Step 211: on the condition that a remaining text section exists, partitioning sequentially the remaining text section into the text-to-be-predicted sets.

In an embodiment of the present disclosure, after a text-to-be-predicted set has been generated, if there is a remaining text section, then, by using the remaining text section, the step 207 is entered, i.e., continuing to partition the text-to-be-predicted set, till all of the text sections have been partitioned into the text-to-be-predicted sets that they belong to.

The embodiment of the present disclosure, by partitioning the text sections according to the first data-volume threshold, ensures that the data volume of the obtained text section is not too large, and, by, when the data volume of the last one text section in the candidate text set obtained according to the first data-volume threshold is greater than the second data-volume threshold, adding the last one text section into the next generated text-to-be-predicted set, ensures that the text section and a text section associated therewith can be in the same one text-to-be-predicted set, which effectively improves the effect of the subsequent classification of the text-to-be-predicted sets by the text classifying model.

The another text partitioning method according to the present disclosure, by, after the extracted text has been partitioned into the text sections according to the line break, partitioning the text with the text sections as the units by using the first data-volume threshold as the restriction to obtain the text-to-be-predicted sets, prevents the problem in the related art of the data losing caused by the partitioning simply based on the data volume, and, by ensuring that the data volume of the last one text section in each of the text-to-be-predicted sets is greater than the second data-volume threshold, ensures that the title information having a small data volume can be partitioned with the following texts associated therewith into the same one text-to-be-predicted set, which improves the reasonableness of the text partitioning, and in turn increases the accuracy of the prediction of the text classifying model. Furthermore, the method, by partitioning the text box according to the segment line in the text box, enables the obtained text boxes to be partitioned more accurately, which prevents the data-line confusion caused by erroneous identification by the parser. Furthermore, the method, by determining the weights of the text boxes according to the coordinate values of the text boxes, and then performing text extraction sequentially to the text boxes according to the weights, ensures that the sequence of the extracted target texts can be the same as that of the arrangement of the text contents in the content image, and prevents the problem of disorder in the text extraction.

Figure 8:
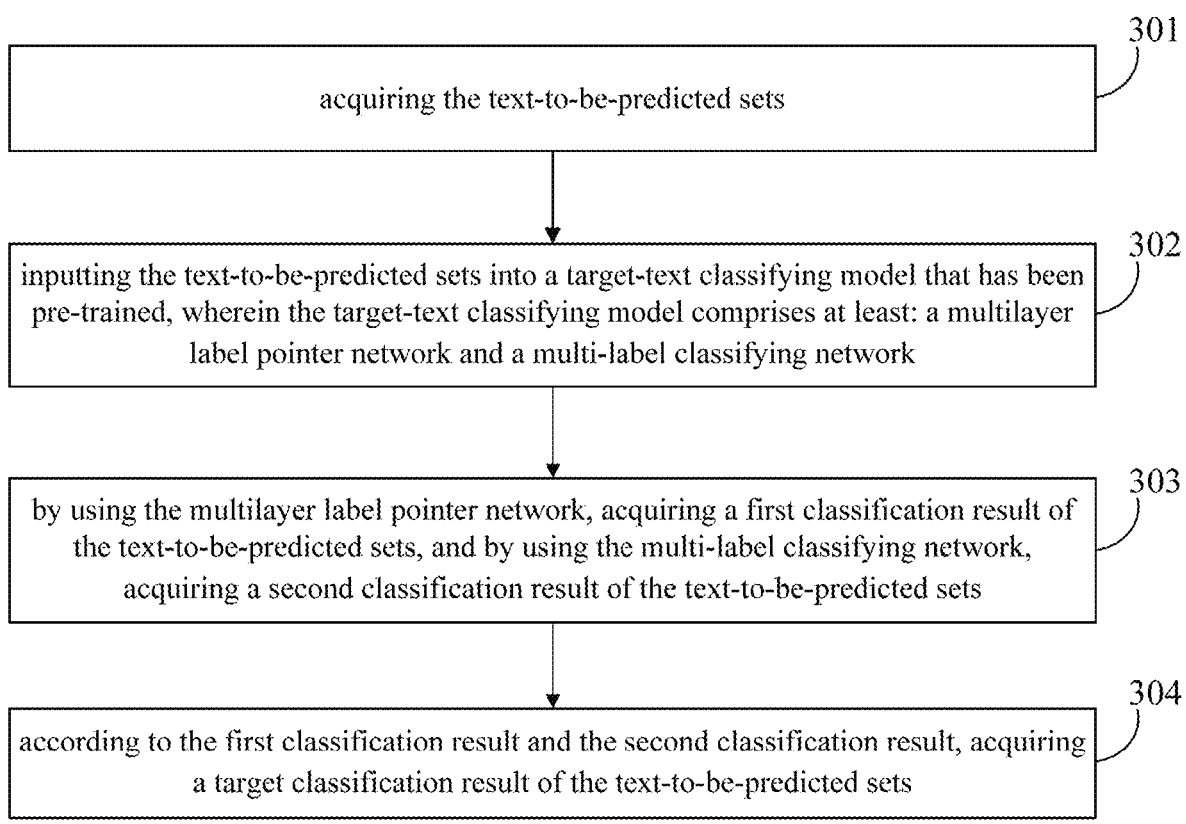
FIG. 8 is a flow chart of the steps of the text classifying method according to an embodiment of the present disclosure.

FIG. 8 is a flow chart of the steps of the text classifying method according to an embodiment of the present disclosure. The method comprises:

Step 301: acquiring the text-to-be-predicted sets.

In an embodiment of the present disclosure, the text-to-be-predicted sets are acquired by using the above text classifying method.

Step 302: inputting the text-to-be-predicted sets into a target-text classifying model that has been pre-trained, wherein the target-text classifying model comprises at least: a multilayer label pointer network and a multi-label classifying network.

In an embodiment of the present disclosure, the target-text classifying model that has been pre-trained is obtained by training the original text set by using sample text sets that are marked in advance with classification labels. The multilayer label pointer network refers to a network model in which, by generating two 0/1 sequences by using two dichotomous networks, a boundary sequence marker of a field to be extracted in the text-to-be-predicted set in the sequences that comprises a head position pointer and a tail position pointer is determined, and the determined boundaries are classified and predicted by using the dichotomous networks. The multilayer label pointer network comprises a plurality of groups of dichotomous networks. Each of the groups of the dichotomous networks include two dichotomous classifiers, wherein one is used for classifying the starting positions of entities, and the other is used for classifying the ending positions of entities. Generally, the quantity of the labels of the prediction is equal to the quantity of the groups of the dichotomous networks. The multi-label classifying network is a global label classifier, and is a network model used for predicting all of the classification labels contained in the current text, acquiring semantic features contained in the text-to-be-predicted sets by using a convolutional layer, performing max pooling by using a shared encoding layer, and accessing a fully connected layer to perform classification prediction.

Step 303: by using the multilayer label pointer network, acquiring a first classification result of the text-to-be-predicted sets, and by using the multi-label classifying network, acquiring a second classification result of the text-to-be-predicted sets.

In an embodiment of the present disclosure, by using the multilayer label pointer network and the multi-label classifying network, a first classification result and a second classification result of the text-to-be-predicted sets may be acquired respectively, and the first classification result and the second classification result may have certain differences.

Step 304: according to the first classification result and the second classification result, acquiring a target classification result of the text-to-be-predicted sets.

In an embodiment of the present disclosure, particularly, the first classification result and the second classification result may be multiplied, to obtain the target classification result of the text-to-be-predicted sets.

The text classifying method according to the embodiments of the present disclosure, by, after the extracted text has been partitioned into the text sections according to the line break, partitioning the text with the text sections as the units by using the first data-volume threshold as the restriction to obtain the text-to-be-predicted sets, prevents the problem in the related art of the data losing caused by the partitioning simply based on the data volume, and, by ensuring that the data volume of the last one text section in each of the text-to-be-predicted sets is greater than the second data-volume threshold, ensures that the title information having a small data volume can be partitioned with the following texts associated therewith into the same one text-to-be-predicted set, which improves the reasonableness of the text partitioning, and in turn increases the accuracy of the prediction of the text classifying model. Additionally, the method, by performing the text classification by using the text classifying model that integrates the multilayer label pointer network and the multi-label classifying network, improves the accuracy of the text classification.

Figure 9:
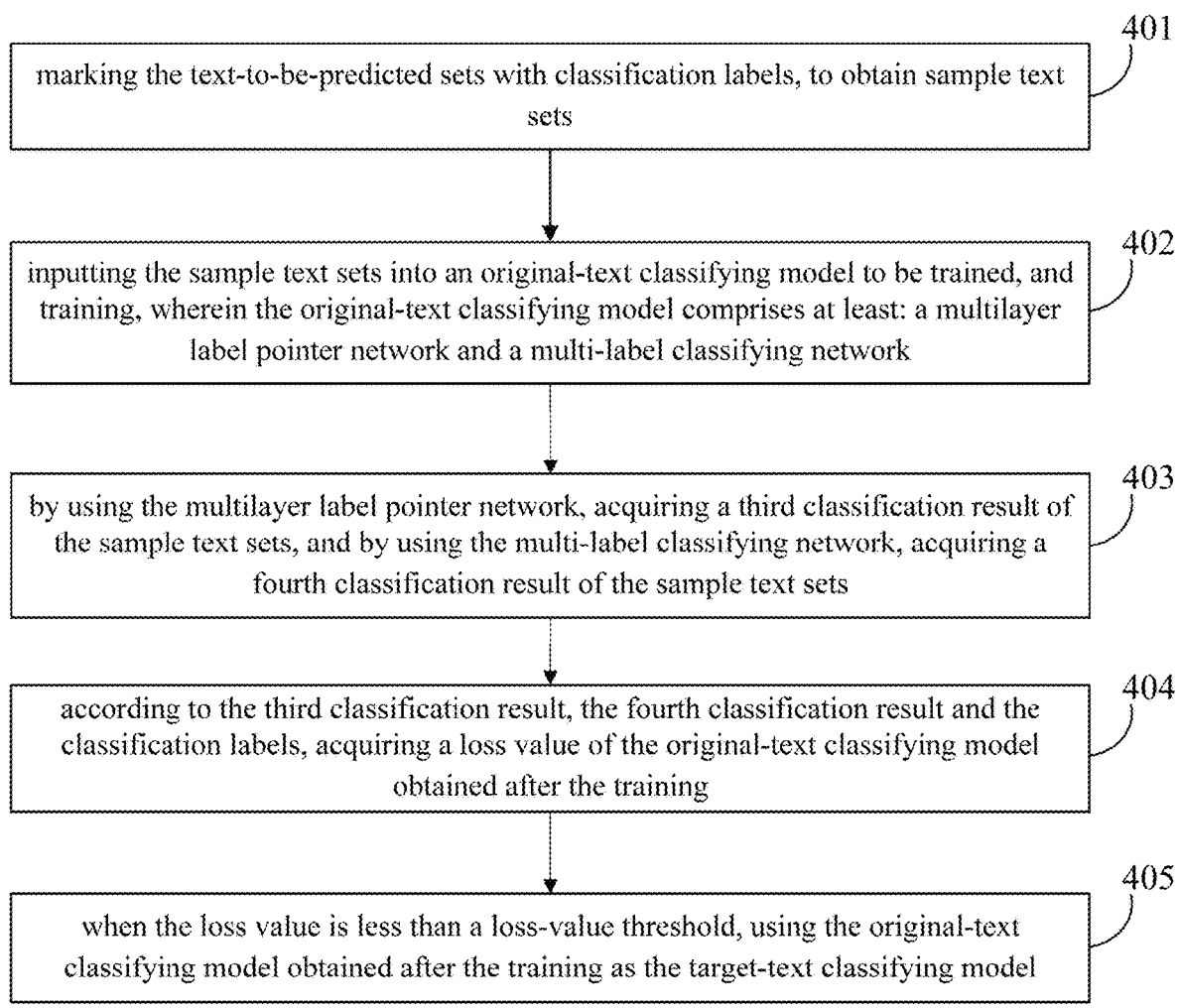
FIG. 9 is a flow chart of the steps of the method for training a text classifying model according to an embodiment of the present disclosure.

FIG. 9 is a flow chart of the steps of the method for training a target-text classifying model according to an embodiment of the present disclosure. The method comprises:

Step 401: marking the text-to-be-predicted sets with classification labels, to obtain sample text sets.

In an embodiment of the present disclosure, the classification labels are used for indicating the classification of the text information in the text-to-be-predicted sets. The marking process may be performed by artificial marking, and may also be performed by using a label marking model, which may be particularly determined according to practical demands, and is not limited herein. After the text-to-be-predicted sets have been marked with the classification labels, it may be used as the sample text sets required by the subsequent model training.

Step 402: inputting the sample text sets into an original-text classifying model to be trained, and training, wherein the original-text classifying model comprises at least: a multilayer label pointer network and a multi-label classifying network.

In an embodiment of the present disclosure, the original-text classifying model is obtained by combining in advance the multilayer label pointer network and the multi-label classifying network, whereby the training process of the original-text classifying model is performed by the cooperation between the two networks, which effectively increases the speed of the effect emergence of the model training, and increases the training efficiency.

Figure 10:
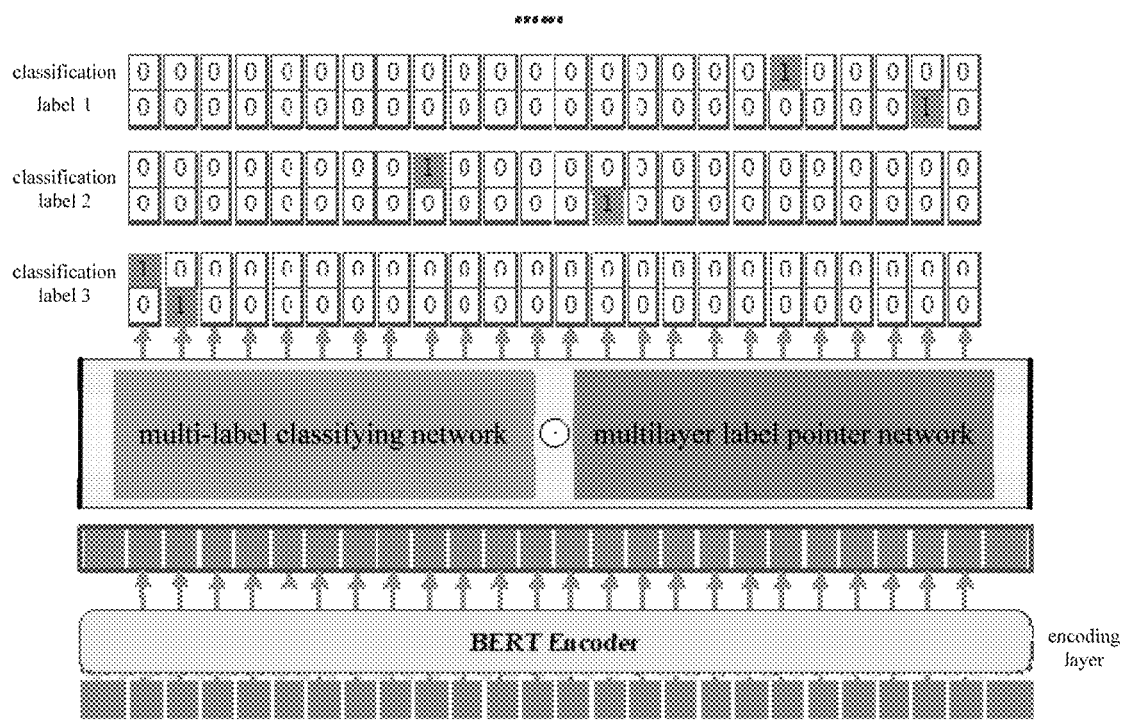
FIG. 10 is a schematic structural diagram of the text classifying model according to an embodiment of the present disclosure.

Particularly, referring to FIG. 10, FIG. 10 shows a schematic structural diagram of a text extracting model. In it, the multilayer label pointer network and the multi-label classifying network are provided in parallel; in other words, the training processes of the two networks have no interference therebetween. However, it will be determined according to the output results of the two networks whether the training of the original-text classifying model has been completed.

In addition, the encoder in FIG. 10 is used for extracting the semantic vectors in the sample text sets, to input the semantic vectors of the sample text sets into the original-text classifying model for the training. Particularly, the encoder according to the embodiment of the present disclosure may be a pre-training language model.

Figure 11:
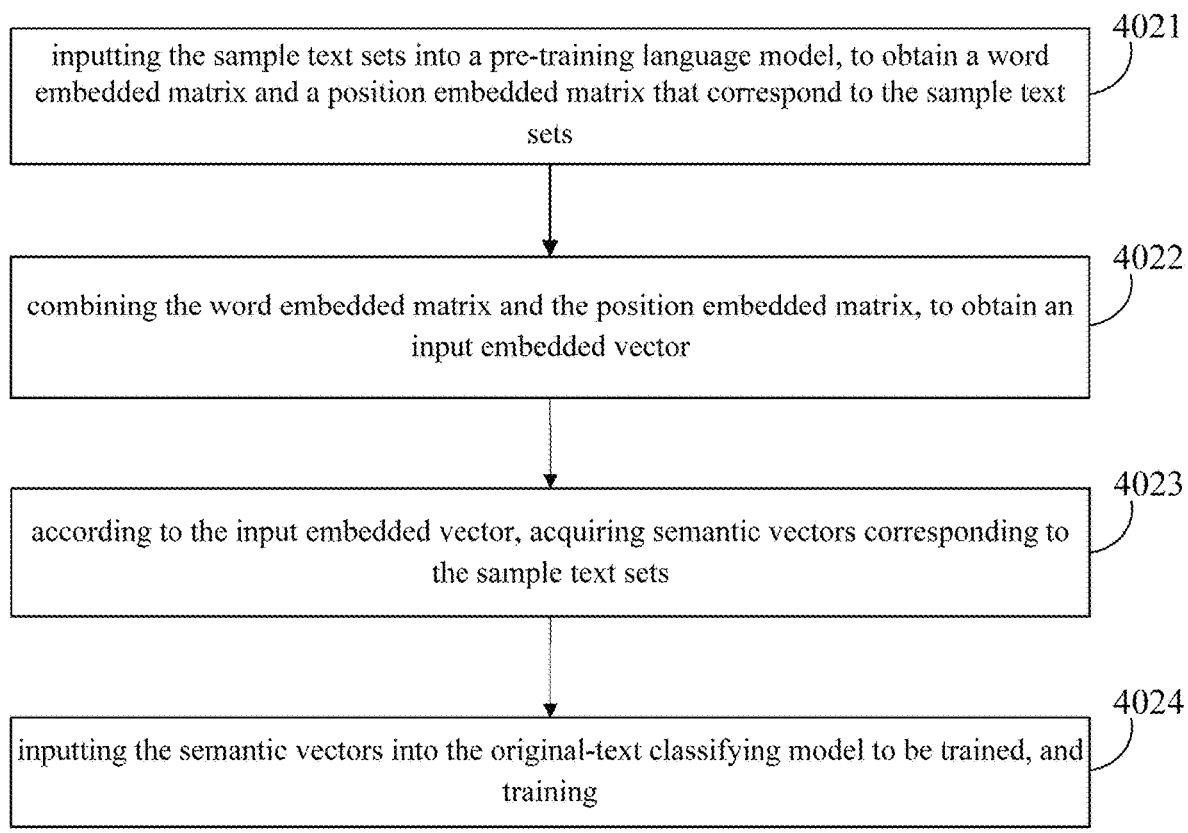
FIG. 11 is a flow chart of the steps of the model inputting method according to an embodiment of the present disclosure.

Optionally, referring to FIG. 11, the step 402 comprises:

Step 4021: inputting the sample text sets into a pre-training language model, to obtain a word embedded matrix and a position embedded matrix that correspond to the sample text sets.

In an embodiment of the present disclosure, the pre-training language model is a pre-training language-representation model, and may be Bidirectional Encoder Representation from Transformers (BERT), RoBERTa (Robustly Optimized BERT Pretraining Approach; a robustness-optimized BERT pre-training approach), NEZHA (a BERT-based Chinese pre-training language model) and so on, which may be particularly determined according to practical demands, and is not limited herein.

After a sample text in a sample text set has been inputted into the pre-training language model, firstly the outputted sentence undergoes word partitioning by using a word divider, to obtain a word-partitioning sequence of the sample text set, and subsequently the word-partitioning sequence is encoded, to obtain a word embedded matrix and a position embedded matrix of the sample text set.

Step 4022: combining the word embedded matrix and the position embedded matrix, to obtain an input embedded vector.

In an embodiment of the present disclosure, the word embedded matrix and the position embedded matrix undergo vectorial addition, and the input embedded vector of the sample text set:

$$h_0 = XW_t + W_p \quad (2)$$

wherein $h_0$ represents the input embedded vector, $W_t$ represents the word embedded matrix, $W_p$ represents the position embedded matrix, and X represents the word-partitioning sequence of the sample word partitioning.

Sub-step 4023: according to the input embedded vector, acquiring semantic vectors corresponding to the sample text sets.

In an embodiment of the present disclosure, the input embedded vector of the sample text set may pass through a N-layered Transformer to obtain the semantic vector of the sample text set.

Particularly, the semantic vector may be obtained by using the following formula (3):

$$h_l = \text{Transformer}(h_{l-1}), l \in [1, N] \quad (3)$$

wherein $h_l$ is the semantic vector, l is the quantity of the layers of the N-layered Transformer, and Transformer( ) is the function of the Transformer.

Step 4024: inputting the semantic vectors into the original-text classifying model to be trained, and training. The embodiment of the present disclosure, by extracting the semantic vectors after the word partitioning and the encoding of the text in the sample text sets, can effectively improve the quality of the semantic vectors, and in turn improve the effect of the subsequent training of the text classifying model.

Step 403: by using the multilayer label pointer network, acquiring a third classification result of the sample text sets, and by using the multi-label classifying network, acquiring a fourth classification result of the sample text sets.

In an embodiment of the present disclosure, this step is similar to the process of the step 303 of predicting the inputted text set by using the target-text classifying model, which, in order to avoid replication, is not discussed here further.

Optionally, referring to FIG. 12, the step 403 comprises:

Sub-step 4031: by using the multilayer label pointer network, acquiring the semantic vectors of the sample text sets, and a starting-position probability value and an ending-position probability value that are related to each of the classification labels, as the third classification result.

In an embodiment of the present disclosure, regarding a semantic vector that has been serialized by using the dichotomous networks, the multilayer label pointer network will, with respect to the semantic vector, output a starting-position probability value and an ending-position probability value with respect to each of the classification labels, which may particularly be expressed as the following formulas (4) and (5):

$$p_i^{s\_l} = \sigma(W_s^l x_i + b_s^l) \quad (4)$$

$$p_i^{e\_l} = \sigma(W_e^l x_i + b_e^l) \quad (5)$$

wherein s represents the starting position, e represents the ending position, l represents the label, $p_i^{s\_l}$ represents the starting-position probability value of the i-th semantic vector, $p_i^{e\_l}$ represents the ending-position probability value of the i-th semantic vector, $x_i$ represents the i-th semantic vector, $b_s^l$ and $b_e^l$ are deviation items of the starting position and the ending position respectively, $\sigma$ is an activation function, and $W_s^l$ and $W_e^l$ are trainable weight vectors of the starting position and the ending position respectively.

Sub-step 4032: by using the multi-label classifying network, acquiring the semantic vectors of the sample text sets, and a classification probability value that is related to each of the classification labels, as the fourth classification result.

In an embodiment of the present disclosure, it is detected by using a multi-label classifying layer in the multi-label classifying network whether a classification label exists in the inputted sample partitioned words, and, particularly, max pooling may be performed by using the following formula (6):

$$x_p = \text{maxpooling}(h_s) \quad (6)$$

wherein $x_p$ represents the probability of a global classification label, $h_s$ identifies the semantic vector, and maxpooling( ) represents a pooling-layer function.

Subsequently, the fourth classification result is acquired by using the following formula (7):

$$p^{global} = \sigma(W^g x_p + b^g) \quad (7)$$

wherein $W^g$ represents a predetermined trainable classification-layer weight vector, $b^g$ represents a deviation item, a represents an activation function, and g represents the global classification label.

Step 404: according to the third classification result, the fourth classification result and the classification labels, acquiring a loss value of the original-text classifying model obtained after the training.

In an embodiment of the present disclosure, firstly, the third classification result and the fourth classification result are combined to obtain a sample classification result, and subsequently the sample classification result is compared with the classification labels of the sample text sets, to obtain the loss value of the original-text classifying model obtained after the training.

Optionally, referring to FIG. 13, the step 404 comprises:

Sub-step 4041: combining individually the starting-position probability value and the ending-position probability value with the classification probability value, to obtain a target starting-position probability value and a target ending-position probability value of the semantic vectors that are related to each of the classification labels.

In an embodiment of the present disclosure, the third classification result and the fourth classification result are combined by using the following formulas (8) and (9):

$$p_i^{s\_label} = p^{global} \Box (\sigma(W_s^l x_i + b_s^l)) \quad (8)$$

$$p_i^{e\_label} = p_{global} \Box (\sigma(W_e^l x_i + b_e^l)) \quad (9)$$

wherein represents the target starting-position probability value, and $p_i^{e\_label}$ represents the target ending-position probability value.

Sub-step 4042: according to the semantic vectors of the sample text sets, and the target starting-position probability value, a standard starting-position probability value, the target ending-position probability value and a standard ending-position probability value that are related to each of the classification labels, acquiring the loss value of the original-text classifying model obtained after the training.

In an embodiment of the present disclosure, the loss value may be calculated by using the following formula (10):

$$\text{loss} = -\sum_{i=1}^{n+2} y_i^{s\_l} \log(p_i^{s\_label}) - \sum_{i=1}^{n+2} y_i^{e\_l} \log(p_i^{e\_label}) \quad (10)$$

wherein loss represents an instantaneous value, n represents the sequence length of the inputted semantic vector, $y_i^{s\_l}$ represents the classification label of the i-th semantic vector at the starting position, and $y_i^{e\_l}$ represents the classification label of the i-th semantic vector at the ending position.

Step 405: on the condition that the loss value is less than a loss-value threshold, using the original-text classifying model obtained after the training as the target-text classifying model.

The method for training a text classifying model according to an embodiment of the present disclosure, by performing cooperative training by using the multilayer label pointer network and the multi-label classifying network to obtain the text classifying model, increases the convergence speed of the text classifying model, and effectively improves the training efficiency and the model effect of the text classifying model.

In an embodiment of the present disclosure, the loss-value threshold may be artificially set, and may also be obtained by statistic analysis, which may be particularly determined according to practical demands, and is not limited herein.

Figure 14:
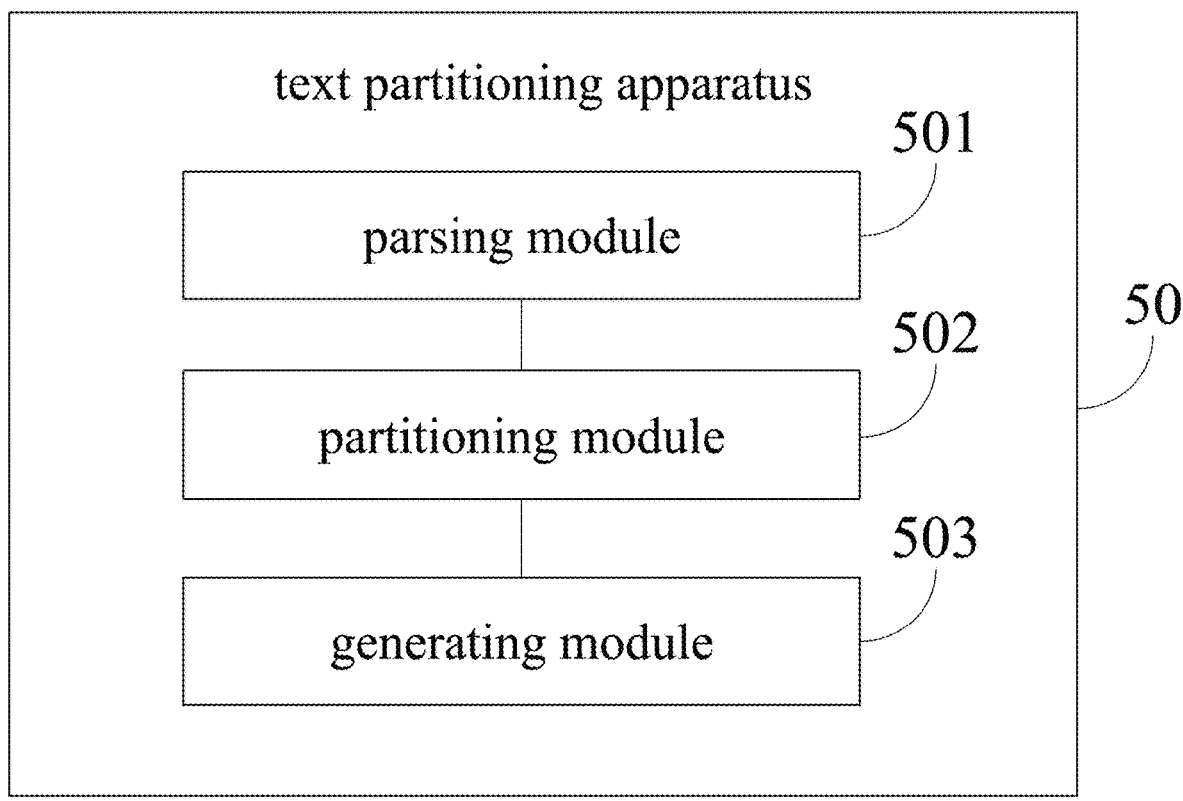
FIG. 14 is a structural block diagram of the text partitioning apparatus according to an embodiment of the present disclosure.

FIG. 14 is a structural block diagram of the text extracting apparatus 50 according to an embodiment of the present disclosure. The apparatus comprises:

a parsing module 501 configured for parsing a content image, to obtain a target text in a text format;

a partitioning module 502 configured for, according to a line break in the target text, partitioning the target text into a plurality of text sections; and a generating module 503 configured for, according to a first data-volume threshold, partitioning sequentially the plurality of text sections into a plurality of text-to-be-predicted sets, wherein a data volume of a last one text section in each of the text-to-be-predicted sets is greater than a second data-volume threshold.

Optionally, the partitioning module 502 is further configured for:

creating an original text set;

reading through the plurality of text sections, adding the text sections that have been read through currently into the original text set, till a data volume of the original text set obtained after the addition is greater than the first data-volume threshold, and using the original text set obtained after the addition as a candidate text set;

on the condition that a data volume of a last one text section in the candidate text set is greater than the second data-volume threshold, using the candidate text set as a text-to-be-predicted set;

on the condition that a data volume of a last one text section in the candidate text set is less than or equal to the second data-volume threshold, taking out the last one text section from the candidate text set, to use the candidate text set obtained after the taking-out as a text-to-be-predicted set; and on the condition that a remaining text section exists, partitioning sequentially the remaining text section into the text-to-be-predicted sets.

Optionally, the partitioning module 502 is further configured for:

according to a blank character in the target text, partitioning the target text into a plurality of text lines; and according to the line break in the target text, partitioning the plurality of text lines into the plurality of text sections.

Optionally, the parsing module 501 is further configured for:

determining a text box in the content image;

determining a segment line in the text box;

according to the segment line, partitioning the text box; and extracting the target text in the text format from the text box obtained after the partitioning.

Optionally, the parsing module 501 is further configured for:
acquiring a coordinate value of the text box; and
using a vertical line where a modal number of a horizontal coordinate in the coordinate value is located as the segment line.

Optionally, the parsing module 501 is further configured for:
according to coordinate values of the text boxes obtained after the partitioning, acquiring weights of the text boxes obtained after the partitioning;
according to the weights, acquiring an extraction sequence of the text boxes obtained after the partitioning; and
according to the extraction sequence, extracting the target text in the text format from the text boxes obtained after the partitioning.

The text extracting apparatus according to the present disclosure, by, after the extracted text has been partitioned into the text sections according to the line break, partitioning the text with the text sections as the units by using the first data-volume threshold as the restriction to obtain the text-to-be-predicted sets, prevents the problem in the related art of the data losing caused by the partitioning simply based on the data volume, and, by ensuring that the data volume of the last one text section in each of the text-to-be-predicted sets is greater than the second data-volume threshold, ensures that the title information having a small data volume can be partitioned with the following texts associated therewith into the same one text-to-be-predicted set, which improves the reasonableness of the text partitioning, and in turn increases the accuracy of the prediction of the text classifying model.

Figure 15:
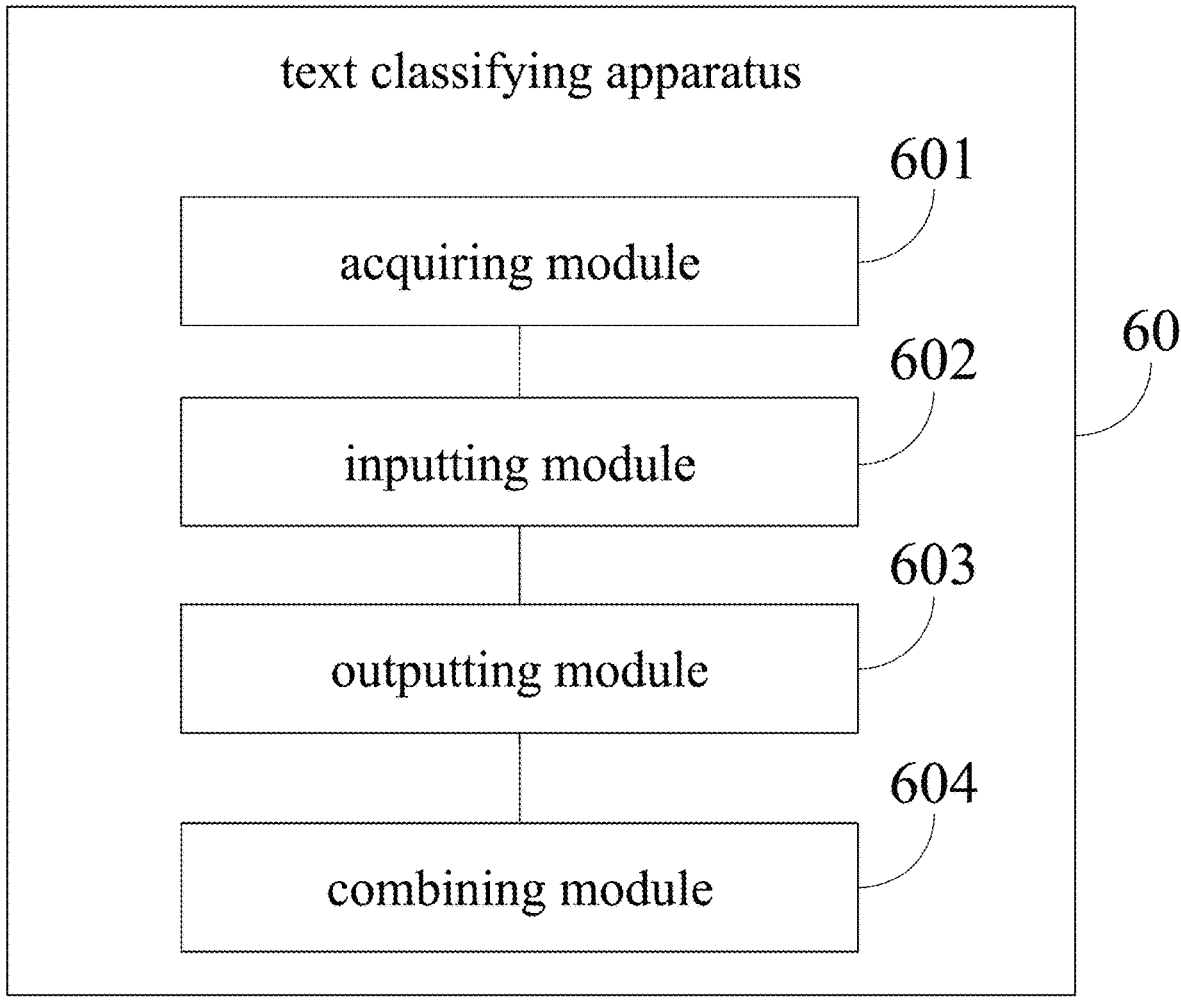
FIG. 15 is a structural block diagram of the text classifying apparatus according to an embodiment of the present disclosure.

FIG. 15 is a structural block diagram of the text classifying apparatus 60 according to an embodiment of the present disclosure. The apparatus comprises:
an acquiring module 601 configured for, by using the text partitioning method in FIGS. 1 to 7, acquiring the text-to-be-predicted sets;
an inputting module 602 configured for inputting the text-to-be-predicted sets into a target-text classifying model that has been pre-trained, wherein the target-text classifying model comprises at least: a multilayer label pointer network and a multi-label classifying network;
an outputting module 603 configured for, by using the multilayer label pointer network, acquiring a first classification result of the text-to-be-predicted sets, and by using the multi-label classifying network, acquiring a second classification result of the text-to-be-predicted sets; and
a combining module 604 configured for, according to the first classification result and the second classification result, acquiring a target classification result of the text-to-be-predicted sets.

Optionally, the apparatus further comprises a pre-training module configured for:
marking the text-to-be-predicted sets with classification labels, to obtain sample text sets;
inputting the sample text sets into an original-text classifying model to be trained, and training, wherein the original-text classifying model comprises at least: a multilayer label pointer network and a multi-label classifying network;
by using the multilayer label pointer network, acquiring a third classification result of the sample text sets, and by using the multi-label classifying network, acquiring a fourth classification result of the sample text sets;
according to the third classification result, the fourth classification result and the classification labels, acquiring a loss value of the original-text classifying model obtained after the training; and
on the condition that the loss value is less than a loss-value threshold, using the original-text classifying model obtained after the training as the target-text classifying model.

Optionally, the apparatus further comprises a pre-training module further configured for:
inputting the sample text sets into a pre-training language model, to obtain a word embedded matrix and a position embedded matrix that correspond to the sample text sets;
combining the word embedded matrix and the position embedded matrix, to obtain an input embedded vector;
according to the input embedded vector, acquiring semantic vectors corresponding to the sample text sets; and
inputting the semantic vectors into the original-text classifying model to be trained, and training.

Optionally, the apparatus further comprises a pre-training module further configured for:
by using the multilayer label pointer network, acquiring the semantic vectors of the sample text sets, and a starting-position probability value and an ending-position probability value that are related to each of the classification labels, as the third classification result; and
by using the multi-label classifying network, acquiring the semantic vectors of the sample text sets, and a classification probability value that is related to each of the classification labels, as the fourth classification result.

Optionally, the apparatus further comprises a pre-training module further configured for:
combining individually the starting-position probability value and the ending-position probability value with the classification probability value, to obtain a target starting-position probability value and a target ending-position probability value of the semantic vectors that are related to each of the classification labels; and
according to the semantic vectors of the sample text sets, and the target starting-position probability value, a standard starting-position probability value, the target ending-position probability value and a standard ending-position probability value that are related to each of the classification labels, acquiring the loss value of the original-text classifying model obtained after the training.

The text classifying apparatus according to the embodiments of the present disclosure, by, after the extracted text has been partitioned into the text sections according to the line break, partitioning the text with the text sections as the units by using the first data-volume threshold as the restriction to obtain the text-to-be-predicted sets, prevents the problem in the related art of the data losing caused by the partitioning simply based on the data volume, and, by ensuring that the data volume of the last one text section in each of the text-to-be-predicted sets is greater than the second data-volume threshold, ensures that the title information having a small data volume can be partitioned with the following texts associated therewith into the same one text-to-be-predicted set, which improves the reasonableness of the text partitioning, and in turn increases the accuracy of the prediction of the text classifying model.

Regarding the system embodiments, because they are substantially similar to the process embodiments, they are described simply, and the related parts may refer to the description on the process embodiments.

Figure 16:
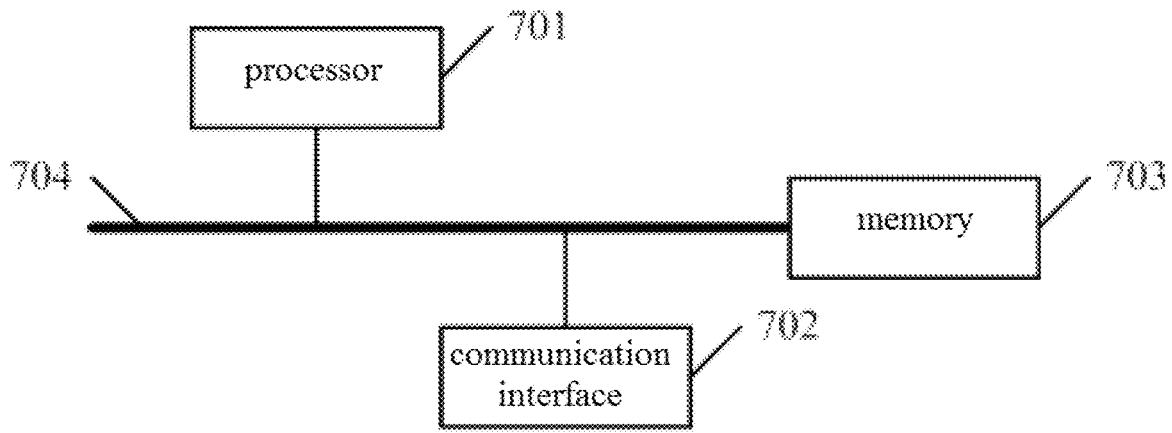
FIG. 16 is a structural block diagram of the electronic device according to an embodiment of the present disclosure.

An embodiment of the present disclosure further provides an electronic device. As shown in FIG. 16, the electronic device comprises a processor 701, a communication interface 702, a memory 703 and a communication bus 704. The processor 701, the communication interface 702 and the memory 703 complete the communication therebetween via the communication bus 704.

The memory 703 is configured for storing a computer program.

The processor 701 is configured for, when executing the program stored in the memory 703, implementing the text partitioning method in FIG. 1 to 7 or the text classifying method in FIGS. 8 to 13.

The communication bus may be a Peripheral Component Interconnect (for short, PCI) bus or an Extended Industry Standard Architecture (for short, EISA) bus and so on. The communication bus may comprise an address bus, a data bus, a control bus and so on. In order to facilitate the illustration, it is merely represented by a thick line in the figure, but that does not mean that there is merely one bus or one type of bus.

The communication interface is used for the communication between the above terminals and other devices.

Figure 17:
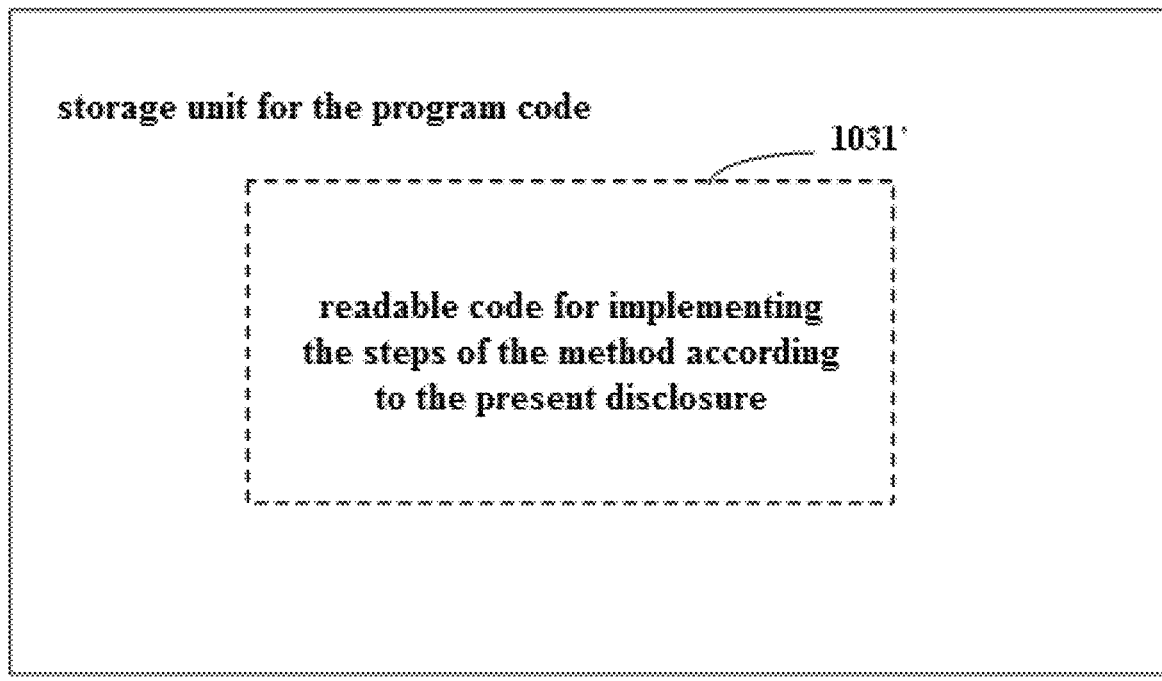
FIG. 17 schematically shows a storage unit for maintaining or carrying a program code for implementing the method according to the present disclosure.

The memory may comprise a Random Access Memory (for short, RAM), and may also comprise a non-volatile memory, for example, at least one disk storage. Optionally, the memory may also be at least one storage device located remotely from the processor. The memory 703 has the storage space 1030 of the program code 1031 for implementing any steps of the above method. For example, the storage space 1030 for program code may contain program codes 1031 for individually implementing each of the steps of the above method. Those program codes may be read from one or more computer program products or be written into the one or more computer program products. Those computer program products include program code carriers such as a hard disk, a compact disk (CD), a memory card or a floppy disk. Such computer program products are usually portable or fixed storage units as shown in FIG. 17. The storage unit may have storage segments or storage spaces with similar arrangement to the memory 703 of the electronic device in FIG. 16. The program codes may, for example, be compressed in a suitable form. Generally, the storage unit contains a computer-readable code 1031', which can be read by a processor such as the processor 701. When those codes are executed by the calculating and processing device, the codes cause the electronic device to implement each of the steps of the method described above.

The processor may be a generic processor, including a Central Processing Unit (for short, CPU), a Network Processor (for short, NP) and so on. The processor may also be a Digital Signal Processing (for short, DSP), an Application Specific Integrated Circuit (for short, ASIC), a Field-Programmable Gate Array (for short, FPGA), or another programmable logic device, discrete gate or transistor logic device, or discrete hardware component.

Another embodiment of the present disclosure further provides a computer-readable storage medium, wherein the computer-readable storage medium stores an instruction, and when the instruction is executed on a computer, the instruction causes the computer to implement the text partitioning method or the text classifying method according to any one of the above embodiments.

Another embodiment of the present disclosure further provides a computer program product containing an instruction, wherein when the instruction is executed on a computer, the instruction causes the computer to implement the text partitioning method or the text classifying method according to any one of the above embodiments.

The above-described device embodiments are merely illustrative, wherein the units that are described as separate components may or may not be physically separate, and the components that are displayed as units may or may not be physical units; in other words, they may be located at the same one location, and may also be distributed to a plurality of network units. Part or all of the modules may be selected according to the actual demands to realize the purposes of the solutions of the embodiments. A person skilled in the art can understand and implement the technical solutions without paying creative work. The above embodiments may be implemented totally or partially by software, hardware, firmware or any combination thereof. When they are implemented by software, they may be implemented totally or partially in the form of a computer program product. The computer program product comprises one or more computer instructions. When the computer program instructions are loaded and executed on a computer, they totally or partially generate the process or functions according to the embodiments of the present disclosure. The computer may be a general-purpose computer, a special-purpose computer, a computer network or another programmable device. The computer instruction may be stored in a computer-readable storage medium, or be transmitted from a computer-readable storage medium to another computer-readable storage medium. For example, the computer instruction may be transmitted from a web site, computer, server or data center to another web site, computer, server or data center in a wired (for example, a coaxial cable, an optical fiber or a digital subscriber line (DSL)) or wireless (for example, infrared, wireless, microwave and so on) manner. The computer-readable storage medium may be any available medium that can be accessed by a computer or a data storage device such as a server and a data center that contains one or more integrated available mediums. The available medium may be a magnetic medium (for example, a floppy disk, a hard disk and a magnetic tape), an optical medium (for example, DVD) or a semiconductor medium (for example, a Solid State Disk (SSD)) and so on.

It should be noted that, in the present text, relation terms such as first and second are merely intended to distinguish one entity or operation from another entity or operation, and that does not necessarily require or imply that those entities or operations have therebetween any such actual relation or order. Furthermore, the terms "include", "comprise" or any variants thereof are intended to cover non-exclusive inclusions, so that processes, methods, articles or devices that include a series of elements do not only include those elements, but also include other elements that are not explicitly listed, or include the elements that are inherent to such processes, methods, articles or devices. Unless further limitation is set forth, an element defined by the wording "comprising a . . . " does not exclude additional same element in the process, method, article or device comprising the element.

The embodiments of the description are described in the mode of correlation, the same or similar parts of the embodiments may refer to each other, and each of the embodiments emphatically describes the differences from the other embodiments. Especially, regarding the system embodiments, because they are substantially similar to the process embodiments, they are described simply, and the related parts may refer to the description on the process embodiments.

The above description is merely preferable embodiments of the present disclosure, and is not indented to limit the protection scope of the present disclosure. Any modifications, equivalent substitutions and improvements that are made within the spirit and the principle of the present disclosure should fall within the protection scope of the present disclosure.

The invention claimed is:

1. A text partitioning method, wherein the method comprises:
   parsing a content image, to obtain a target text in a text format;
   according to a line break in the target text, partitioning the target text into a plurality of text sections; and
   according to a first data-volume threshold, partitioning sequentially the plurality of text sections into a plurality of text-to-be-predicted sets, wherein a data volume of a last one text section in each of the text-to-be-predicted sets is greater than a second data-volume threshold wherein the plurality of text-to-be-predicted sets are used to be inputted into a semantic identification model to be used for semantic identification;
   wherein the step of, according to the first data-volume threshold, partitioning sequentially the plurality of text sections into the plurality of text-to-be-predicted sets comprises:
   creating an original text set;
   reading through the plurality of text sections, adding the text sections that have been read through currently into the original text set, till a data volume of the original text set obtained after the addition is greater than the first data-volume threshold, and using the original text set obtained after the addition as a candidate text set;
   on the condition that a data volume of a last one text section in the candidate text set is greater than the second data-volume threshold, using the candidate text set as a text-to-be-predicted set;
   on the condition that a data volume of a last one text section in the candidate text set is less than or equal to the second data-volume threshold, taking out the last one text section from the candidate text set, to use the candidate text set obtained after the taking-out as a text-to-be-predicted set; and
   on the condition that a remaining text section exists, partitioning sequentially the remaining text section into the text-to-be-predicted sets.

2. The method according to claim 1, wherein the step of, according to the line break in the target text, partitioning the target text into the plurality of text sections comprises:
   according to a blank character in the target text, partitioning the target text into a plurality of text lines; and
   according to the line break in the target text, partitioning the plurality of text lines into the plurality of text sections.

3. The method according to claim 1, wherein the step of parsing the content image, to obtain the target text in the text format comprises:
   determining a text box in the content image;
   determining a segment line in the text box;
   according to the segment line, partitioning the text box; and
   extracting the target text in the text format from the text box obtained after the partitioning.

4. The method according to claim 3, wherein the step of determining the segment line in the text box comprises:
   acquiring a coordinate value of the text box; and
   using a vertical line where a modal number of a horizontal coordinate in the coordinate value is located as the segment line.

5. The method according to claim 3, wherein the step of extracting the target text in the text format from the text box obtained after the partitioning comprises:
   according to coordinate values of the text boxes obtained after the partitioning, acquiring weights of the text boxes obtained after the partitioning;
   according to the weights, acquiring an extraction sequence of the text boxes obtained after the partitioning; and
   according to the extraction sequence, extracting the target text in the text format from the text boxes obtained after the partitioning.

6. A text classifying method, wherein the method comprises:
   by using the text partitioning method according to claim 1, acquiring the text-to-be-predicted sets;
   inputting the text-to-be-predicted sets into a target-text classifying model that has been pre-trained, wherein the target-text classifying model comprises at least: a multilayer label pointer network and a multi-label classifying network;
   by using the multilayer label pointer network, acquiring a first classification result of the text-to-be-predicted sets, and by using the multi-label classifying network, acquiring a second classification result of the text-to-be-predicted sets; and
   according to the first classification result and the second classification result, acquiring a target classification result of the text-to-be-predicted sets.

7. The method according to claim 6, wherein the target-text classifying model is obtained by training by using the following steps:
   marking the text-to-be-predicted sets with classification labels, to obtain sample text sets;
   inputting the sample text sets into an original-text classifying model to be trained, and training, wherein the original-text classifying model comprises at least: a multilayer label pointer network and a multi-label classifying network;
   by using the multilayer label pointer network, acquiring a third classification result of the sample text sets, and by using the multi-label classifying network, acquiring a fourth classification result of the sample text sets;
   according to the third classification result, the fourth classification result and the classification labels, acquiring a loss value of the original-text classifying model obtained after the training; and
   on the condition that the loss value is less than a loss-value threshold, using the original-text classifying model obtained after the training as the target-text classifying model.

8. The method according to claim 7, wherein the step of inputting the sample text sets into the original-text classifying model to be trained, and training comprises:
   inputting the sample text sets into a pre-training language model, to obtain a word embedded matrix and a position embedded matrix that correspond to the sample text sets;
   combining the word embedded matrix and the position embedded matrix, to obtain an input embedded vector;

according to the input embedded vector, acquiring semantic vectors corresponding to the sample text sets; and
inputting the semantic vectors into the original-text classifying model to be trained, and training.

9. The method according to claim 8, wherein the step of, by using the multilayer label pointer network, acquiring the third classification result of the sample text sets, and by using the multi-label classifying network, acquiring the fourth classification result of the sample text sets comprises:
by using the multilayer label pointer network, acquiring the semantic vectors of the sample text sets, and a starting-position probability value and an ending-position probability value that are related to each of the classification labels, as the third classification result; and
by using the multi-label classifying network, acquiring the semantic vectors of the sample text sets, and a classification probability value that is related to each of the classification labels, as the fourth classification result.

10. The method according to claim 9, wherein the step of, according to the third classification result, the fourth classification result and the classification labels, acquiring the loss value of the original-text classifying model obtained after the training comprises:
combining individually the starting-position probability value and the ending-position probability value with the classification probability value, to obtain a target starting-position probability value and a target ending-position probability value of the semantic vectors that are related to each of the classification labels; and
according to the semantic vectors of the sample text sets, and the target starting-position probability value, a standard starting-position probability value, the target ending-position probability value and a standard ending-position probability value that are related to each of the classification labels, acquiring the loss value of the original-text classifying model obtained after the training.

11. An electronic device, wherein the electronic device comprises a memory, a processor and a computer program that is stored in the memory and is executable on the processor, and the processor, when executing the computer program, performs the following operations:
parsing a content image, to obtain a target text in a text format;
according to a line break in the target text, partitioning the target text into a plurality of text sections; and
according to a first data-volume threshold, partitioning sequentially the plurality of text sections into a plurality of text-to-be-predicted sets, wherein a data volume of a last one text section in each of the text-to-be-predicted sets is greater than a second data-volume threshold wherein the plurality of text-to-be-predicted sets are used to be inputted into a semantic identification model to be used for semantic identification;
wherein the operation performed by the processor of according to a first data-volume threshold, partitioning sequentially the plurality of text sections into a plurality of text-to-be-predicted sets comprises:
creating an original text set
reading through the plurality of text sections, adding the text sections that have been read through currently into the original text set, till a data volume of the original text set obtained after the addition is greater than the first data-volume threshold, and using the original text set obtained after the addition as a candidate text set;
on the condition that a data volume of a last one text section in the candidate text set is greater than the second data-volume threshold, using the candidate text set as a text-to-be-predicted set;
on the condition that a data volume of a last one text section in the candidate text set is less than or equal to the second data-volume threshold, taking out the last one text section from the candidate text set, to use the candidate text set obtained after the taking-out as a text-to-be-predicted set; and
on the condition that a remaining text section exists, partitioning sequentially the remaining text section into the text-to-be-predicted sets.

12. The electronic device according to claim 11, wherein the operation performed by the processor of according to a line break in the target text, partitioning the target text into a plurality of text sections comprises:
according to a blank character in the target text, partitioning the target text into a plurality of text lines; and
according to the line break in the target text, partitioning the plurality of text lines into the plurality of text sections.

13. The electronic device according to claim 11, wherein the processor further performs the following operations:
by using the operations of claim 11, acquiring the text-to-be-predicted sets;
inputting the text-to-be-predicted sets into a target-text classifying model that has been pre-trained, wherein the target-text classifying model comprises at least: a multilayer label pointer network and a multi-label classifying network;
by using the multilayer label pointer network, acquiring a first classification result of the text-to-be-predicted sets, and by using the multi-label classifying network, acquiring a second classification result of the text-to-be-predicted sets; and
according to the first classification result and the second classification result, acquiring a target classification result of the text-to-be-predicted sets.

14. A computer-readable storage medium, wherein the computer-readable storage medium stores a computer program, and the computer program, when executed by the processor, performs the following operations:
parsing a content image, to obtain a target text in a text format;
according to a line break in the target text, partitioning the target text into a plurality of text sections; and
according to a first data-volume threshold, partitioning sequentially the plurality of text sections into a plurality of text-to-be-predicted sets, wherein a data volume of a last one text section in each of the text-to-be-predicted sets is greater than a second data-volume threshold wherein the plurality of text-to-be-predicted sets are used to be inputted into a semantic identification model to be used for semantic identification;
wherein the operation performed by the computer program of according to a first data-volume threshold, partitioning sequentially the plurality of text sections into a plurality of text-to-be-predicted sets comprises:
creating an original text set;
reading through the plurality of text sections, adding the text sections that have been read through currently into the original text set, till a data volume of the original text set obtained after the addition is greater than the first data-volume threshold, and using the original text set obtained after the addition as a candidate text set;

on the condition that a data volume of a last one text section in the candidate text set is greater than the second data-volume threshold, using the candidate text set as a text-to-be-predicted set;

on the condition that a data volume of a last one text section in the candidate text set is less than or equal to the second data-volume threshold, taking out the last one text section from the candidate text set, to use the candidate text set obtained after the taking-out as a text-to-be-predicted set; and on the condition that a remaining text section exists, partitioning sequentially the remaining text section into the text-to-be-predicted sets.

15. The computer-readable storage medium according to claim 14, wherein the operation performed by the computer program of according to a line break in the target text, partitioning the target text into a plurality of text sections comprises:

according to a blank character in the target text, partitioning the target text into a plurality of text lines; and according to the line break in the target text, partitioning the plurality of text lines into the plurality of text sections.

16. The computer-readable storage medium according to claim 14, wherein the computer program further performs the following operations:

by using the operations of claim 14, acquiring the text-to-be-predicted sets;

inputting the text-to-be-predicted sets into a target-text classifying model that has been pre-trained, wherein the target-text classifying model comprises at least: a multilayer label pointer network and a multi-label classifying network;

by using the multilayer label pointer network, acquiring a first classification result of the text-to-be-predicted sets, and by using the multi-label classifying network, acquiring a second classification result of the text-to-be-predicted sets; and according to the first classification result and the second classification result, acquiring a target classification result of the text-to-be-predicted sets.

* * * * *